United States Patent [19]

Kimura et al.

[11] Patent Number: 5,245,489
[45] Date of Patent: Sep. 14, 1993

[54] GUIDE ARM WITH A FIXED PRINTED CIRCUIT BOARD FOR MAGNETIC DISK DRIVE

[75] Inventors: Hideyuki Kimura, Tsuchiura; Takuji Torii, Ushiku; Tsuyoshi Takahashi, Odawara; Hiroshi Nishida, Kanagawa; Kenji Mori; Yuzo Yamaguchi, both of Tsuchiura; Yokuo Saitoh, Kanagawa; Kihachiro Tanaka, Ushiku; Shinobu Yoshida, Tsuchiura, all of Japan

[73] Assignee: Hitachi, Ltd., Tokyo, Japan

[21] Appl. No.: 842,491

[22] Filed: Feb. 27, 1992

Related U.S. Application Data

[62] Division of Ser. No. 592,914, Oct. 4, 1990, Pat. No. 5,140,482.

[51] Int. Cl.⁵ .......................... G11B 5/48; G11B 21/16
[52] U.S. Cl. .................................... 360/104; 360/97.02
[58] Field of Search ............................ 360/103–104, 360/97.02, 137

[56] References Cited

U.S. PATENT DOCUMENTS

| | | | |
|---|---|---|---|
| 4,823,217 | 4/1989 | Kato et al. | 360/104 |
| 4,949,194 | 8/1990 | MacPherson et al. | 360/104 |
| 5,014,145 | 5/1991 | Hosokawa et al. | 360/104 |

FOREIGN PATENT DOCUMENTS

| | | |
|---|---|---|
| 54-54614 | 1/1979 | Japan .................................. 360/103 |
| 61-16076 | 1/1986 | Japan . |
| 61-123068 | 6/1986 | Japan . |
| 2-304712 | 12/1990 | Japan .................................. 360/103 |

OTHER PUBLICATIONS

IBM/TDB vol. 20, No. 5, Oct. 1977 pp. 1984–1985 "Actuator Assembly for a Disk File" by Dunmau et al.

Primary Examiner—John H. Wolff
Attorney, Agent, or Firm—Antonelli, Terry, Stout & Kraus

[57] ABSTRACT

A head arm for use in a magnetic disk drive, comprising a guide arm disposed between a magnetic head and an actuator so as to transmit actuating force of the actuator to the magnetic head thereby guiding the magnetic head along a plane of a magnetic disk, a printed circuit fixed to the guide arm, and deflection compensating member for making the coefficients of thermal expansion of said guide arm and said printed circuit substantially equal to each other in at least the direction of seek of the head arm. No thermal deformation in an out-of-plane direction occurs on such a head arm regardless of any variation in the temperature of the environment in which the magnetic disk drive is installed. A head arm may also comprise a guide arm and a printed circuit formed of a moisture absorptive material and covered at all or part of its surfaces with a covering layer formed of a moisture resistive material not permeable to moisture. No deformation in an out-of-plane direction occurs on such a head arm regardless of any variation in the humidity of the environment in which the magnetic disk drive is installed. Therefore, the possibility of occurrence of off-track can be minimized.

3 Claims, 11 Drawing Sheets

WIDTH RATIO $\phi \left( = \dfrac{W_C}{W_A} \right)$

RELATION BETWEEN COEFFICIENT
OF THERMAL EXPANSION OF Aℓ-Si
ALLOY AND AMOUNT OF Si
(COEFFICIENT OF THERMAL EXPANSION:
MEAN VALUE BETWEEN ROOM TEMP.
AND 200°C)

GUIDE ARM WITH A FIXED PRINTED CIRCUIT BOARD FOR MAGNETIC DISK DRIVE

This is a division of application Ser. No. 592,914, filed Oct. 4, 1990, now U.S. Pat. No. 5,140,482.

BACKGROUND OF THE INVENTION

This invention relates to a head arm for use in a magnetic disk drive and more particularly to a head arm of the kind described above which is not deformed in itself under what ever environmental conditions so as to minimize undesirable off-track of a magnetic head relative to a magnetic disk.

Capability of attaining a high information recording density is now demanded more and more for a magnetic disk drive, and, in order to attain this high information recording density, it is required that a magnetic head carried by a head arm be accurately positioned relative to a desired track on a magnetic recording medium such as a magnetic disk. On the other hand, the general-purpose usability is also demanded for the magnetic disk drive. That is, the magnetic disk drive it now frequently installed in, for example, a laboratory in addition to its usual place of installation in a room such as an air-conditioned computer room. Therefore, the head arm tends to be subjected to thermal deformation due to a variation in the temperature of the environment in which the magnetic disk drive is operated. The thermal deformation of the head arm is undesirable in that it leads to occurrence of off-track of a magnetic head relative to a magnetic disk. JP-A-61-123068 discloses a method for compensating this undesirable off-track. According to the method disclosed in the cited application, the head arm is made by integrally combining or bonding together two kinds of materials, that is, the material of the head arm and a resin material into a plurality of laminated layers so as to suitably adjust the coefficient of thermal expansion of the entire head arm in the direction of access or seek, thereby minimizing the off-track due to differential elongation of the head arm in that direction. JP-A-61-16076 discloses another method for off-track compensation.

According to the method disclosed in this application, a member having a coefficient of thermal expansion different from that of the head arm is combined with the head arm so as to form an assembly similar to a bimetal, thereby compensating the undesirable off-track by the bimetal-like function.

In the prior art method disclosed in JP-A-61-123068, the adjustment of the thermal expansion of each of the head arms in the direction of seek is only noted so as to minimize the thermal off-track due to the differential elongation. However, in this application in which the head arm is formed by bonding, to the material of the head arm, the resin which is the material different from that of the head arm, deflection of the head arm of the above structure in an out-of-plane direction due to a variation in the ambient temperature (deflection similar to that of a bimetal) is not utterly taken into consideration. In a modern magnetic disk drive, the problem of the off-track attributable to the deflection of the head arm in the out-of-plane direction is especially closed up. Also, the head arm formed by laminating a plurality of layers of different kinds of materials as described above has inevitably an increased weight which may give rise to a problem in regard to the drive of the head arm.

On the other hand, in the prior art method disclosed in JP-A-61-16076 cited above, the off-track attributable to the difference between the amounts of thermal expansion of various parts of the magnetic disk drive is compensated by causing deformation of the head arm. More concretely, a member having a coefficient of thermal expansion different from that of the head arm is combined with the head arm as described above so as to provide the head arm with the function of a bimetal, thereby forcedly causing deformation of the head arm in the out-of-plane direction, that is, in the axial direction of the spindle supporting magnetic disks. However, even when deformation of a part of the magnetic disk drive due to the difference between the amounts of thermal expansion of various parts of the magnetic disk drive. (for example, tilting of the spindle) is to be compensated by deformation of each of the head arms, the coefficient of thermal expansion of the member combined with one of the head arms must be selected to be different from that of the member combined with another head arm, because the amount of compensation by the latter head arm differs from that of compensation by the former head arm. Such a magnetic disk drive will not be fully satisfactorily usable for general purposes.

SUMMARY OF THE INVENTION

It is a first object of the present invention to provide a head arm for use in a magnetic disk drive, which is provided with a flexible printed circuit and which is not deformed in an out-of-plane direction regardless of any variation in the temperature of an environment in which the magnetic disk drive is installed.

A second object of the present invention is to provide a head arm for use in a magnetic disk drive, which is provided with a flexible printed circuit having lead wires sandwiched between layers of a high polymer material and which is not deformed in an out-of-plane direction regardless of any variation in the humidity of an environment in which the magnetic disk drive is installed.

A third object of the present invention is to provide a head arm for use in a magnetic disk drive, which is provided with a flexible printed circuit having lead wires sandwiched between layers of a high polymer material and which is not deformed in an out-of-plane direction regardless of any variations in both the temperature and the humidity of an environment in which the magnetic disk drive is installed.

An embodiment of the head arm according to the first object of the present invention will now be described. The printed circuit is bonded to the head arm, and there is the possibility that the head arm provided with the printed circuit may be deformed in the out-of-plane direction, as in the case of JP-A-61-16076, when a variation occurs in the temperature of the environment in which the magnetic disk drive is installed. This deformation tends to cause undesirable off-track of a magnetic head relative to a magnetic disk. In the head arm of the present invention attaining the first object, the coefficient of thermal expansion of a guide arm interposed between a magnetic head and an actuator so as to retain the magnetic head and to transmit actuating force of the actuator to the magnetic head thereby guiding the magnetic head along a plane of a magnetic disk is made equal to the coefficient of thermal expansion of the printed circuit by provision of a deflection compensating member.

Another embodiment of the head arm according to the second object of the present invention will now be described. The inventors made strenuous researches and studies so as to attain the first object described above and discovered that not only a temperature variation in the installed environment but also a humidity variation in the environment provides the cause of deformation in the out-of-plane direction of the head arm provided with the printed circuit. More precisely, when the printed circuit is formed of a high polymer material such as a polyimide, the high polymer material absorbs moisture and expands greatly as compared to the guide arm. This expansion of the high polymer material causes the undesirable deformation in the out-of-plane direction of the head arm provided with the printed circuit.

Therefore, the head arm according to the present invention has such a structure that part or all of the surfaces of the printed circuit formed of the moisture absorptive material is covered with a covering material which is not permieable to moisture and which does not expand nor contract in itself by absorbing moisture, so as to attain the second object described above.

In still another embodiment of the head arm of the present invention, the coefficient of thermal expansion of the printed circuit is made substantially equal to that of the guide arm when the covering material described above is used to cover the printed circuit, so as to attain the third object described above.

DESCRIPTION OF THE PREFERRED EMBODIMENTS

Preferred embodiments of the present invention will now be described in detail with reference to the drawings.

Figure 1:
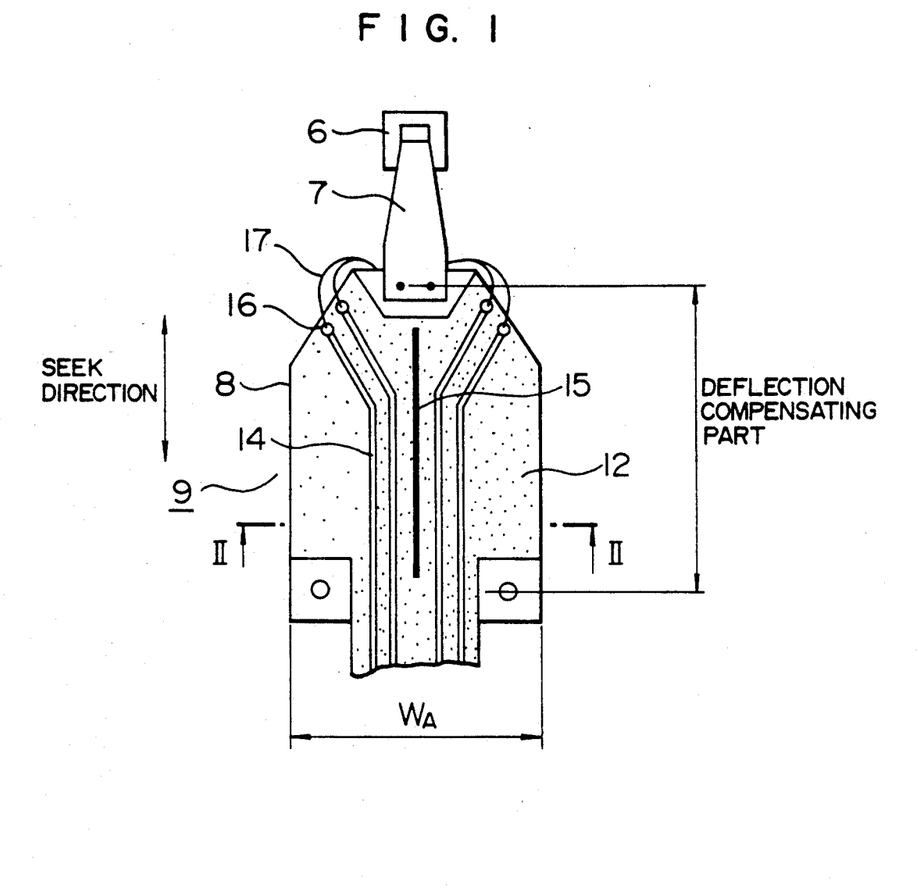
FIG. 1 is a schematic plane view of an embodiment of the head arm according to the present invention.
Figure 2:
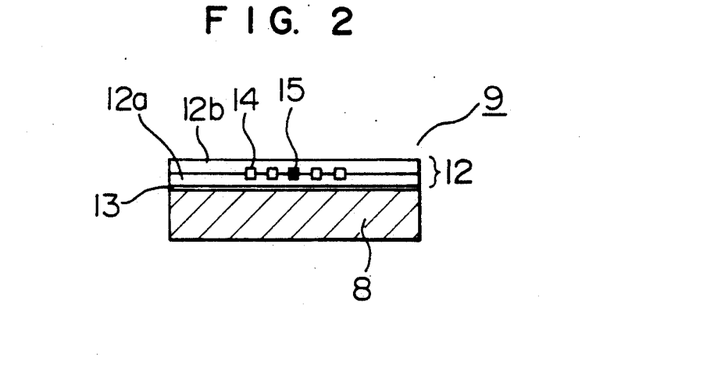
FIG. 2 is a schematic sectional view taken along the line II—II in FIG. 1.

FIGS. 1 and 2 show a preferred embodiment of the head arm according to the present invention. Before describing in detail the embodiment of the head arm of the present invention shown in FIGS. 1 and 2, an example of a magnetic disk drive using the head of the present invention will be described with reference to FIG. 3, so that the present invention can be clearly understood.

Figure 3:
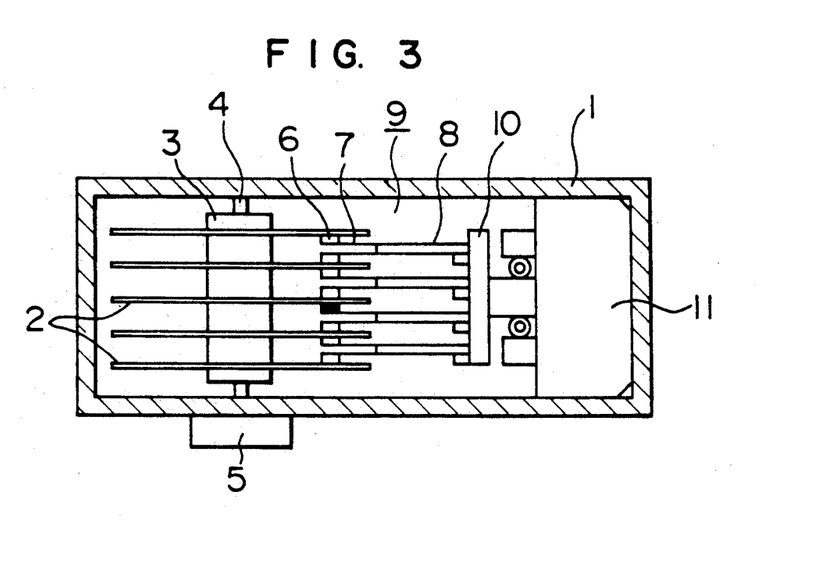
FIG. 3 is a schematic sectional view of an example of a magnetic disk drive using the head arm embodying the present invention.

Referring to Fig, 3, the magnetic disk drive includes a housing 1, a plurality of magnetic disks 2 stacked in tiers in the housing 1 through spaces 3 and coaxially mounted on a spindle 4 driven by a drive motor 5, a plurality of magnetic heads 6 for writing and reading information on and from the associated magnetic disks 2, a plurality of load arms 7 each supporting one of the magnetic heads 6, and a plurality of guide arms 8 each mounting one pair of the load arms 7. Each of the guide arms 8 and the load arm pair 7 connected to the guide arm 8 constitute a head arm 9. The magnetic disk drive further includes an arm holder 10 holding the head arms 9, and an actuator 11 for actuating the head arms 9. When the actuator 11 actuates the head arms 9, each of the magnetic heads 6 carried by the front end of the head arms 9 is accurately positioned relative to a selected information track on the associated magnetic disk 3 thereby writing and reading information on and from the information track.

Referring to FIGS. 1 and 2 again, the head arm 9 has a double-layer structure in which a flexible printed circuit (FPC) 12 is bonded by a bonding agent 13 to one of the surfaces of the guide arm 8 formed of an aluminum alloy. Both the guide arm 8 and the FPC 12 have a small thickness. For example, the thickness of the guide arm 8 is several mm, and that of the FPC 12 is several ten $\mu m$ to several hundred $\mu m$. In the head arm 9 shown in FIGS. 1 and 2, the amount of thermal expansion of the FPC 12 is larger than that of the guide arm 8. The FPC 12 has such a laminated structure that a plurality of fine strip-like lead wires 14 each in the form of a copper foil for transmitting information to and from the magnetic heads 6 are sandwiched between a pair of thin layers 12a and 12b of a polyimide resin.

A deflection compensating member 15 provided according to the present invention is disposed in the FPC 12. In the head arm 9 shown in FIGS. 1 and 2, a filament of copper foil similar to that forming the lead wires 14 is used to form the deflection compensating member 15. External lead wires 17 are connected between the magnetic heads 6 and corresponding terminals 16 of the lead wires 14. In the head arm 9 shown in FIGS. 1 and 2, only one deflection compensating member 15 extends in the direction of access or seek by the magnetic heads 6. Although the deflection compensating member 15 may be formed of any one of suitable materials having a coefficient of thermal expansion smaller than that of the guide arm 8, the same material as that forming the lead wires 14 is preferably employed for each of handling because the deflection compensating member 15 is also disposed in the FPC 12. Further, in lieu of bonding the FPC 12 to the guide arm 8, the FPC 12 may be fixed to the guide arm 8 by means such as screws in the case of the head arm 9 according to the present invention.

Figure 4:
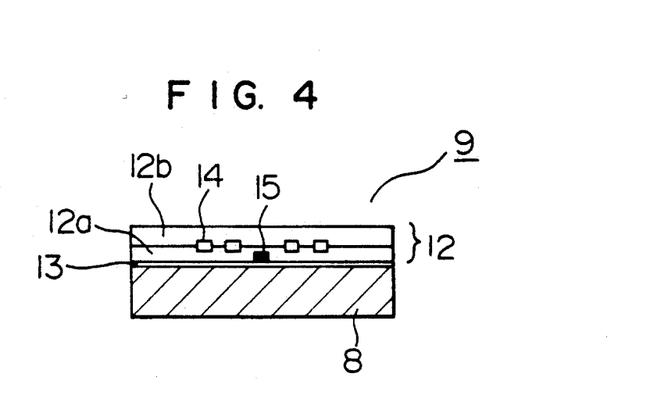
FIGS. 4 and 5 are schematic sectional views of other embodiments respectively of the head arm of the present invention.
Figure 5:
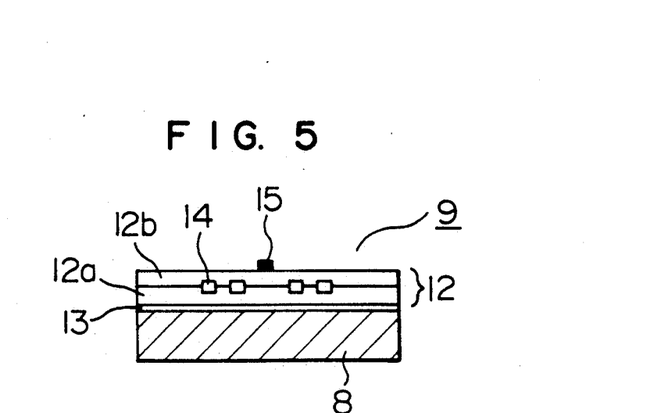

In FIG. 2, the deflection compensating member 15 is embedded between the resin layers 12a and 12b of the FPC 12 in which the copper-foil lead wires 14 are also embedded. However, the deflection compensating member 15 may be disposed at any one of positions as shown in FIGS. 4 and 5. In the modification shown in FIG. 4, the deflection compensating member 15 is disposed at a position near the guide arm 8 and bonded to the FPC 12. On the other hand, in the modification shown in FIG. 5, the deflection compensating member 15 is bonded to the outer surface of the outer resin layer 12b of the FPC 12. In the forms shown in FIGS. 2, 4 and 5, the deflection compensating members 15 are disposed at respectively different positions, and their deflection compensation effect is not the same. Therefore, it is apparent that attention is to be paid to the deflection compensation effect which differs depending on the disposed position of the deflection compensating member 15. Further in the forms shown in FIGS. 4 and 5, the deflection compensating member 15 is located outside of the internal circuit of the FPC 12. Therefore, the material of the deflection compensating member 15 is not limited to the copper foil and may be and suitable one having a coefficient of thermal expansion smaller than that of the guide arm 8. Also, the shape of the deflection compensating member 15 is not limited to the filament of foil and may be in the form of a film. When the material of the guide arm 8 is a magnesium alloy or the aluminum alloy described already, the material of the deflection compensating member 15 may be an iron alloy such as a stainless steel, or titanium, silver or the like besides the copper.

The lead wires 14 must be electrically insulated. However, the deflection compensating member 15, in which no current flows, may contact the guide arm 8 or may be exposed to the exterior.

In the structure shown in FIG. 2, the FPC 12 is bonded together with the deflection compensating member 15 to the guide arm 8 by the bonding agent 13. In this case, the factors affecting the deflection of the head arm 9 include, besides the coefficient of thermal expansion and the Young's modulus (the modulus of longitudinal elasticity) of each of the guide arm 8, the FPC 12 (the resin layers 12a, 12b and the lead wires 14) and the deflection compensating member 15, the coefficient of thermal expansion, the Young's modulus, etc. of the bonding agent 13. It is therefore necessary to take those additional factors into consideration in the determination of the material and the size (the thickness, the width, etc.) of the deflection compensating member 15. In the description of the present invention, the term "thermal expansion" is used to include the coefficient of thermal expansion, the Young's modulus, etc. described above.

The effect of deflection compensation according to the present invention will now be described with reference to FIG. 6. In the graph shown in FIG. 6, the vertical axis represents the amount of deflection Δ of the head arm 9, and the horizontal axis represents the width ratio $$\phi = \frac{W_c}{W_A}$$

where $W_A$ is the width of the guide arm 8, and $W_c$ is the total width of the plural copper-foil lead wires 14 shown in FIG. 1.

Suppose, for example, that this width ratio $\phi$ is $\phi = \phi_o$ when the deflection compensating member 15 is not provided. The coefficient of thermal expansion of the FPC 12 is larger than that of the guide arm 8. Therefore, when the temperature of the environment rises, the amount of deflection Δ of the head arm 9 increases in the plus direction and is given by a point a marked with a white dot as shown in FIG. 6. On the other hand, when the deflection compensating member 15 (the copper foil) is disposed in the FPC 12 as shown in FIG. 1, the width ratio $\phi$ increases to a value $\phi_x$ ($\phi_o \rightarrow \phi_x$). That is, the amount of deflection Δ of the head arm 9 changes and shifts now to a point b marked with a black dot from the point a marked with the white dot. Thus, the amount of deflection Δ of the head arm 9 can now be decreased to Δ = ±0.

When the width ratio $\phi$ is further increased, the amount of deflection Δ of the head arm 9 decreases in the minus direction, that is, shifts to a point c marked with an x, and the effect of deflection compensation is lost. Thus, in order that the amount of deflection Δ of the head arm 9 is to be reduced to $\phi = 0$, it is required to suitably select the width ratio $\phi$, that is it may be necessary to provide a plurality of deflection compensating members 15 or to suitably determine the width of the deflection compensating member 15. It is apparent that in lieu of changing the width of the deflection compensating member 15, the thickness of the deflection compensating member 15 may be suitably changed. Also, both the width and the thickness of the deflection compensating member 15 may be suitably changed. That is, the cross-sectional area of the deflection compensating member 15 in a direction orthogonal with respect to the direction of seek is preferably suitably changed.

Figure 7:
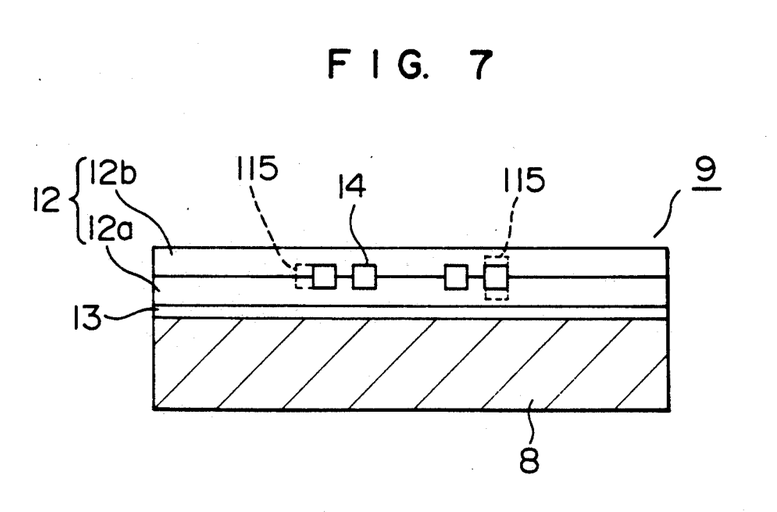
FIG. 7 is a schematic sectional view of another embodiment of the head arm of the present invention.

In lieu of arranging the deflection compensating member 15 to extend in parallel to the lead wires 14, the cross-sectional area of the lead wires 14 may be suitably increased as shown in FIG. 7. In the modification shown in FIG. 7, the cross-sectional area of each of the two lead wires 14 among the four is increased as shown by a portion 115 surrounded by broken lines, and the sum of the cross-sectional areas of the portions 115 is selected to be equal to the cross-sectional area of the deflection compensating member 15.

The amount of deflection Δ of the head arm 9 is required to completely satisfy the relation Δ = 0. However, when the deflection compensating member 15 capable of completely satisfying the requirement Δ = 0 is difficult to be incorporated in the FPC 12, the deflection compensating member 15 is preferably disposed so that the amount of deflection of the head arm 9 can be reduced as close to zero as possible.

Figure 8:
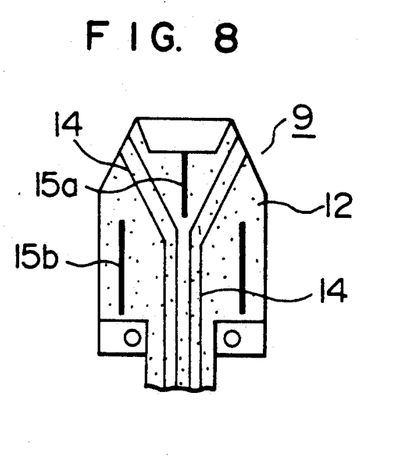
FIGS. 8, 9, 10 and 11 are schematic plan view of other embodiments respectively of the head arm of the present invention.

FIG. 8 shows a modification of the head arm 9 in which three deflection compensating members 15a and 15b are disposed in the FPC 12 to extend in the direction of seek by the head arm 9. Thus, the provision of the single deflection compensating member 15 is not the essential requirement, and a plurality of deflection compensating members may be provided as desired. In this case, it is desirable that the width ratio $\phi$ is to be suitable selected so that the amount of deflection Δ of the head arm 9 along the direction of seek can be reduced to Δ=0.

Figure 9:
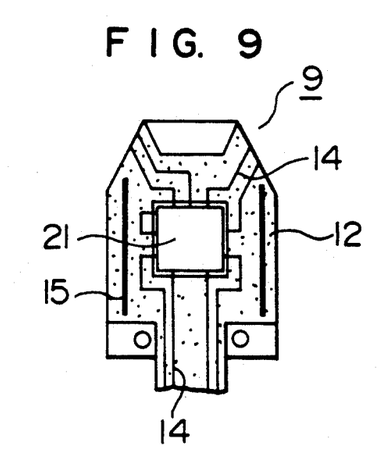

FIG. 9 shows another modification of the head arm 9 in which an IC chip 21 for servo or data purpose is provided. Although a change in the amount of deflection Δ of the head arm 9 due to the provision of the IC chip 21 must also be considered in this modification, the amount of deflection Δ of the head arm 9 can be reduced to zero or a value very close to zero by provision of two deflection compensating members 15 as shown. When the IC chip 21 is provided on the head arm 9, the number of the copper-foil lead wires 14 in the FPC 12 inevitably increases. In this case, the width ratio $\phi$ increases as shown in FIG. 6, and the value of the width ratio $\phi$ approaches $\phi_x$ from $\phi_o$, with the result that the amount of deflection Δ of the head arm 9 can be reduced. When the amount of deflection Δ of the head arm 9 cannot be still reduced to Δ=0, it is necessary to provide the two deflection compensating members 15 as shown. Thus, the basic idea of the present invention remains the same even when the IC chip 21 is provided on the head arm 9. While the following direction is mainly directed to the case where the IC chip 21 is not provided on the head arm 9, the ideal of the present invention is similarly applicable to the case where the IC chip 21 is provided.

Figure 10:
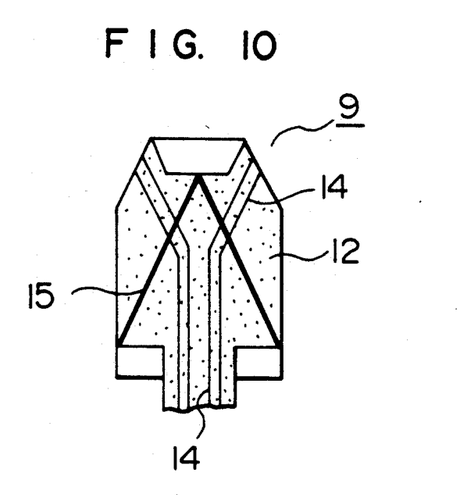
Figure 11:
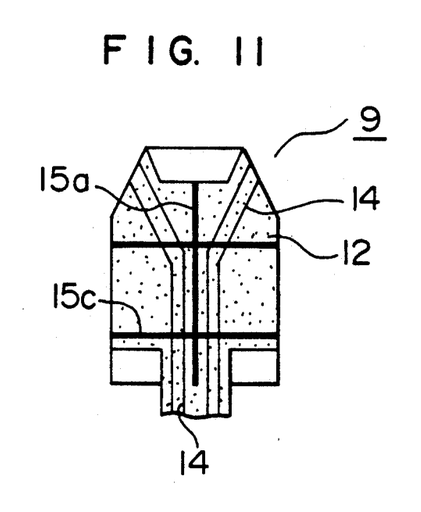

The deflection compensating member or members 15 are disposed to extend along the direction of seek in the aforementioned embodiments. In a modification of the head arm 9 shown in FIG. 10, the deflection compensating members 15 are disposed to make an angle with respect to the direction of seek. Further, the deflection compensating member or members 15 need not be rectilinear in shape but may have a curvature. Further, the purpose of provision of the deflection compensating member or members 15 is not limited to the prevention of deflection of the head arm 9 in the direction of seek only. In a modification of the head arm 9 shown in FIG. 11, two deflection compensating members 15c are provided in addition to one deflection compensating member 15a and extend in a direction orthogonal with respect to the direction of seek. When the lead wires 14 in the FPC 12 are symmetrically arranged, the deflection compensating members 15 are also preferably symmetrically arranged. Further, the deflection compensating members 15 may be selectively located at the areas where the head arm 9 is subjected to a large amount of deflection. In the modifications of the head arm 9 shown in FIGS. 10 and 11, the deflection compensating members 15 are disposed on the upper surface of the FPC 12 as in the case of the modification shown in FIG. 5.

The deflection compensating member 15 in the form of a filament of copper foil is used in the aforementioned embodiments. However, this deflection compensating member 15 may be in the form of a sheet or a wire or may be formed of a fine particulate material.

Figure 12:
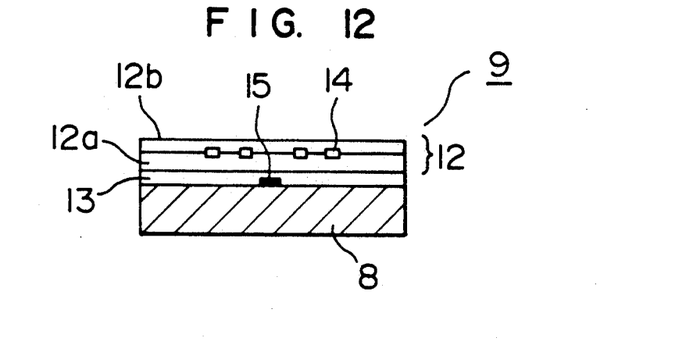
FIGS. 12, 13, 14, 15, 16, 17, 18A, 18B and 19 are schematic sectional views of other embodiments respectively of the head arm of the present invention.
Figure 13:
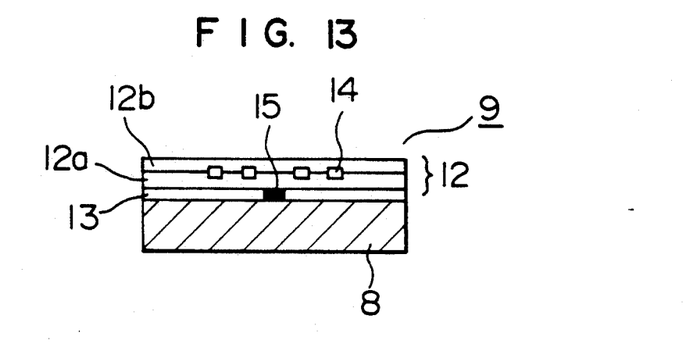
Figure 14:
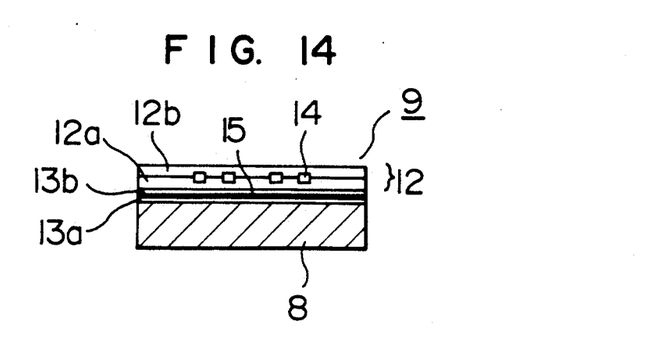

FIG. 12 shows a modification of the head arm 9 in which the deflection compensating member 15 is disposed on the surface of the guide arm 8 facing the associated surface of the FPC 12. FIGS. 13 and 14 show other modifications of the head arm 9 in which the deflection compensating member 15 is disposed in the layer of the bonding agent 13. Each of these modifications can exhibit the same effect of deflection compensation as that described above. In the modifications shown in FIGS. 12 and 13, the deflection compensating member 15 may have a strip shape or any other suitable shape. Also, in the modification shown in FIG. 14, the deflection compensating member 15 may have a foil shape, a film shape or any other suitable shape. In each of these modifications, the material of the deflection compensating member 15 may be, for example, a stainless steel. Further, in each of the modifications shown in FIGS. 13 and 14, the portions of the bonding agent 13 on both sides of the deflection compensating member 15 may be of different kinds in lieu of the same kind. Further, in the modification shown in FIG. 12, a groove may be formed on the surface of the guide arm 8, and the deflection compensating member 15 may be inserted in and bonded to the groove. In this case, the thickness of the deflection compensating member 15 is preferably as small as possible.

Figure 15:
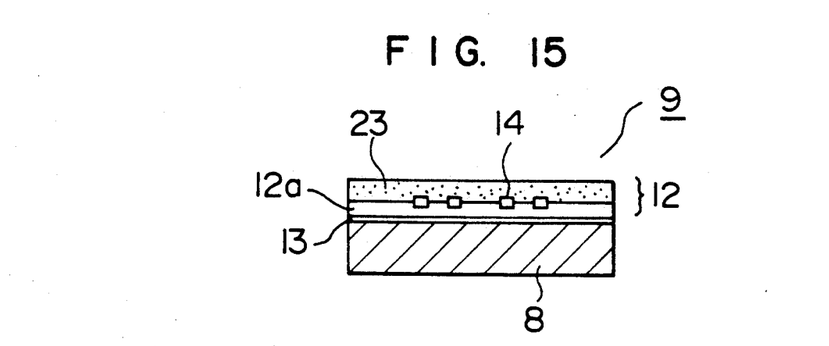
Figure 16:
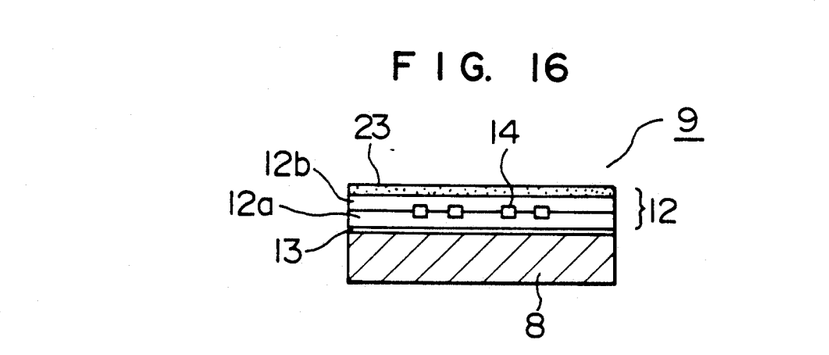

FIGS. 15 and 16 show modifications of the head arm 9 in which a deflection compensating film 23 (a mixture) obtained by mixing a material having a coefficient of thermal expansion smaller than that of the material of the guide arm 8 with a resin or the like is provided on the guide arm 8 to replace the deflection compensating member 15. This material is mixed in the form of, for example, foils, fine particles or whiskers. The whiskers are discontinuous fibers, and the resin mixed with the whiskers provides a fiber reinforced material. Because the coefficient of thermal expansion of the FPC 12 is larger than that of the guide arm 8, the coefficient of thermal expansion of the deflection compensating film 23 is selected to be smaller than that of the guide arm 8, and the deflection compensating film 23 is to be disposed on the surface of the FPC 12 remote from the guide arm 8.

In the modification shown in FIG. 15, the material having the coefficient of thermal expansion smaller than that of the material of the guide arm 8 is mixed in the outer resin layer 12b of the FPC 12 to form the deflection compensating film 23. Thus, this film 23 acts also as the outer resin layer 12b of the FPC 12. It is apparent that this film 23 may be disposed to replace the resin layer 12a of the FPC 12 which is nearer to the guide arm 8.

In the modification shown in FIG. 16, the deflection compensating film 23 is bonded to the outer surface of the outer resin layer 12b of the FPC 12. This deflection compensating film 23 need not cover the entire outer surface of the head arm 9, but may be locally bonded when it is provided effective for the purpose of deflection compensation. The amount of thermal expansion of the deflection compensating film 23 can be changed as desired by suitably selecting the resin and the material mixed with the resin or by suitably selecting the thickness of the film 23 or the percentage of the material mixed with the resin.

Figure 17:
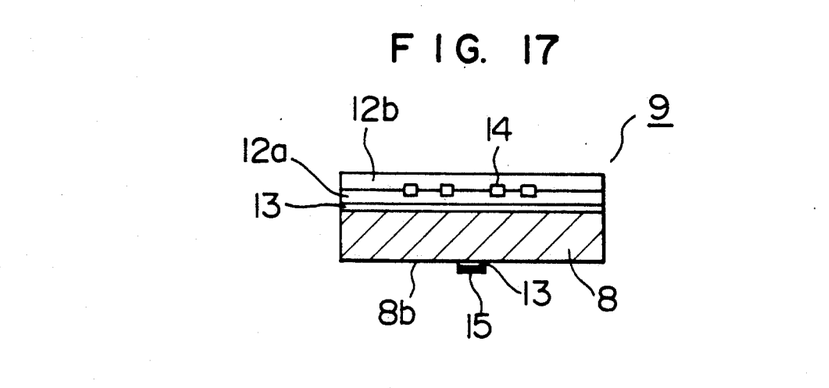
Figure 18A:
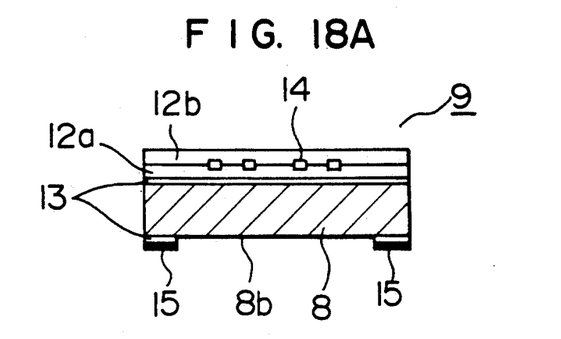
Figure 18B:
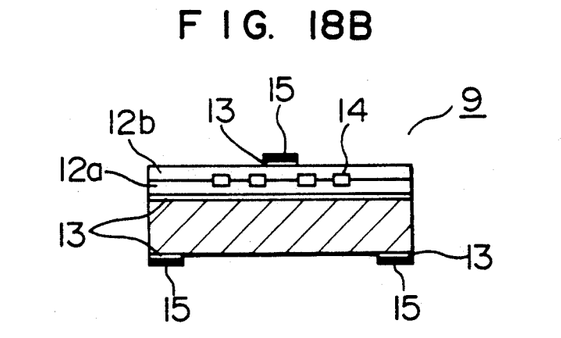

FIGS. 17, 18A and 18B show modifications of the head arm 9 in which the deflection compensating member 15 whose coefficient of thermal expansion is equivalent to that of the FPC 12, when that of the bonding agent 13 is also taken into consideration, is disposed on the outer surface 8b of the guide arm 8 remote from the FPC 12.

In the modification shown in FIG. 17, only one deflection compensating member 15 is disposed at the middle position of the outer surface 8b of the guide arm 8, and, in the modification shown in FIG. 18A, two deflection compensating members 15 are disposed at both ends respectively of the outer surface 8b of the guide arm 8. In each of these modifications, the deflection compensating member 15 may be further divided into a plurality of segments, provided that the total amount of thermal expansion is equivalent to that of the FPC 12. Thus, because the coefficient of thermal expansion of the deflection compensating member or members 15 is equivalent to that of the FPC 12, a variation in the temperature of the head arm 9 would not cause any deflection of the head arm 9.

In the modification shown in FIG. 18B, the deflection compensating members 15 can be disposed on the outer surfaces of both the FPC 21 and the guide arm 8 as shown.

Figure 19:
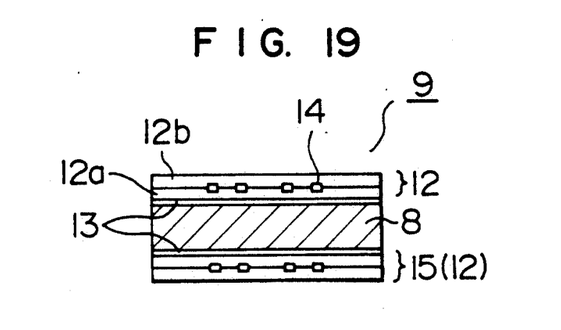

FIG. 19 shows a modification of the head arm 9 formed by a method which is most simple and convenient and which does not requires any especial consideration. In the modification shown in FIG. 19, two FPC's 12, which are entirely the same with each other and have the copper-foil lead wires 14, are bonded to both surfaces respectively of the guide arm 8. In this case, the FPC 12 bonded to the lower surface of the guide arm 8 in FIG. 19 acts as the deflection compensating member 15, and its lead wires 14 do not contribute to the transmission of information. According to the arrangement shown in FIG. 19, both the FPC's 12 act in the same way on the guide arm 8 in response to a temperature variation in the head arm 9, so that no deflection occurs on the head arm 9.

Figure 20:
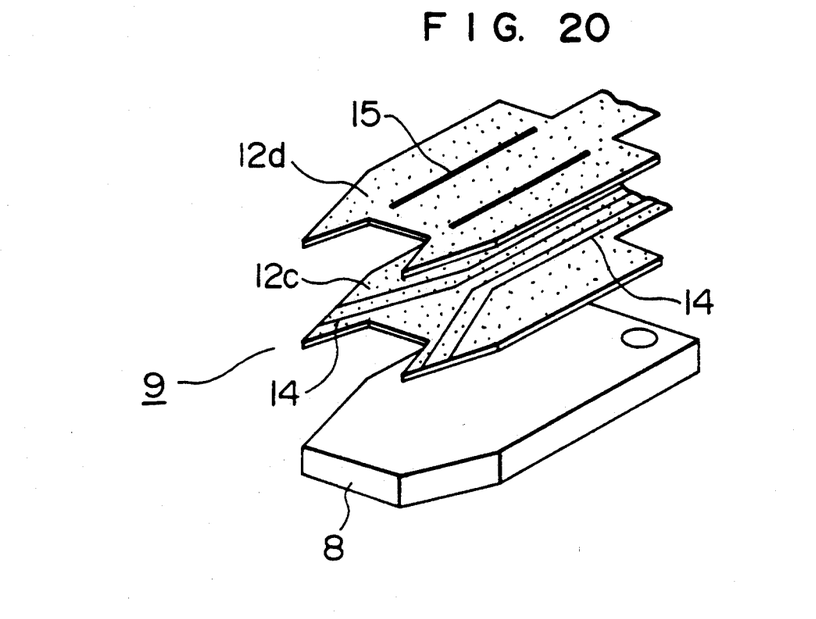
FIG. 20 is a schematic perspective exploded view of another embodiment of the head arm of the present invention.
Figure 21:
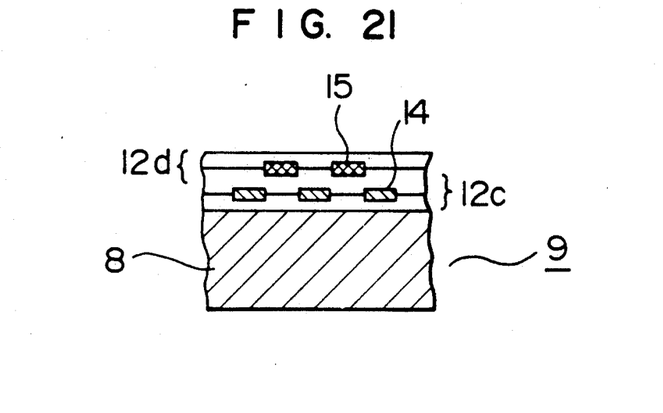
FIG. 21 is a schematic sectional view of the embodiment shown in FIG. 20.

FIG. 20 is a schematic perspective exploded view of a modification of the head arm 9 in which the FPC 12 is divided in two parts 12c, 12d, and two deflection compensating members 15 are embedded in one of the two parts 12c and 12d of the FPC 12, and FIG. 21 is a schematic sectional view of the head arm 9 of FIG. 20 after assembling (bonding). The FPC 12 may be sandwiched between two split parts of the guide arm 8. Referring to FIGS. 20 and 21, the two parts 12c and 12d of the FPC 12 are disposed on one surface of the guide arm 8, and the copper-foil lead wires 14 are disposed in the inner part 12c of the FPC 12 nearer to the guide arm 8, while the deflection compensating members 15 are disposed in the outer part 12d of the FPC 12 so as to reduce the amount of deflection $\Delta$ of the head arm 9 to $\Delta=0$. These two parts 12c and 12d of the FPC 12 are joined by a polyimide resin common to them. In the modifications shown in FIGS. 20 and 21, the number of the parts or layers forming the FPC 12 may be selected to be more than two when so required. However, when the amount of the polyimide resin is excessively large, the amount of thermal expansion of the entire head arm 9 in the direction of seek will become larger than that of the guide arm 8 formed of the aluminum alloy. In such a case, the difference between the amount of thermal expansion of the head arm 9 in the direction of seek and that of the guide arm 8 made of the aluminum alloy will become excessively large. Such an excessively large difference between the amounts of thermal expansion in the direction of seek is undesirable. Therefore, when the FPC 12 of multiple layer structure is employed, the total thickness of the polyimide resin layers is preferably made as small as possible.

Figure 6:
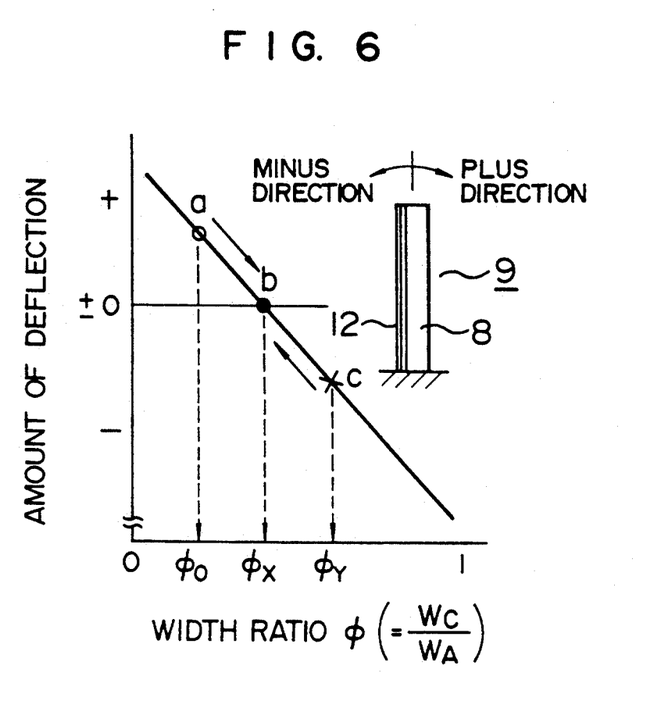
FIG. 6 is a graph showing the effect of deflection compensation according to the present invention.

The aforementioned embodiments have referred to the case where the coefficient of thermal expansion of the guide arm 8 is smaller than that of the FPC 12, that is, the case where the amount of deflection $\Delta$ of the head arm 9 is $+\Delta$ in FIG. 6. However, there is a contrary case, that is, the case where the amount of deflection $\Delta$ of the head arm 9 is $-\Delta$ in FIG. 6. Table 1 tabulates these cases. In Table 1, the symbols $\alpha_A$, $\alpha_F$ and $\alpha_X$ represent the amounts of thermal expansion of the guide arm 8, the FPC 12 and the deflection compensating member 15 respectively. Herein, the "amount of thermal expansion" represents the value in which the coefficient of thermal expansion, the Young's modulus and the size and the mounted position or location of the deflection compensating member 15 are taken into account together with the influence of those of the bonding agent 13 when used. Also, the symbols side A and side B in Table 1 designate the locations of the deflection compensating member 15 in the FPC 12 near and remote from the guide arm 8 respectively. When the amount of thermal expansion becomes larger with the increase in the temperature, this can be considered that the amount of thermal contraction with the decrease in the temperature becomes also larger.

TABLE 1

| No. | Comparison of thermal expansion | Deflection compensating member | |
|---|---|---|---|
| | | Thermal expansion | Location |
| 1 | $\alpha_A < \alpha_F$ | $\alpha_X < \alpha_A$ | Side A |
| 2 | | $\alpha_X = \alpha_F$ | Side B |
| 3 | $\alpha_A > \alpha_F$ | $\alpha_X > \alpha_A$ | Side A |
| 4 | | $\alpha_X = \alpha_F$ | Side B |

The amounts of thermal expansion in the cases No. 1 and No. 2 in Table 1 are as described already. Therefore, the cases No. 3 and No. 4 will now be described herein. The fact that the amount of thermal expansion of the FPC 12 is smaller than that of the guide arm 8 (that is, $\alpha_A > \alpha_F$) means that the number of the copper-foil lead wires 14 embedded in the FPC 12 is large. In other words, this means that the width ratio $\phi$ in FIG. 6 is, for example, $\phi_Y$ larger than $\phi_X$. In this case, when the number of the lead wires 14, that is, the width ratio $\phi$, is decreased, the amount of deflection $\Delta$ of the head arm 9 can be shifted along the curve shown in FIG. 6, that is, in the direction of from $\phi_Y$ toward $\phi_X$ (in the direction of the arrow c→b in FIG. 6) until the amount of deflection $\Delta$ is reduced to $\Delta=0$. However, it is practically difficult to decrease the number of the required lead wires 14. This difficulty can be dealt with in a manner as described now.

The basic way of thinking is to inverse the relation $\alpha_A < \alpha_F$ in the cases No. 1 and No. 2 in Table 1.

First, the case No. 3 will be considered. Because the amount of thermal expansion of the FPC 12 is smaller than that of the guide arm 8, the deflection compensating member 15 showing the amount of thermal expansion larger than that of the guide arm 8 (that is, $\alpha_X > \alpha_A$) is preferably disposed on the side A of the FPC 12. The structure of the head arm 9 is similar to that of the aforementioned embodiments of the head arm 9 shown in FIGS. 1 to 16 except that in the structure of the head arm 9 thus constructed, the relation between the amounts of thermal expansion of the FPC 12 and the deflection compensating member 15 and that of the guide arm 8 is merely inversed from the case No. 1. The material of the deflection compensating member 15 showing the amount of thermal expansion larger than that of the guide arm 8 is, for example, of polyimide resin forming the parts 12a and 12b of the FPC 12 or a plastic material such as a polyamide resin.

It is apparent that the case No. 4 can be dealt with in the same way on the basis of the case No. 2.

Figure 22:
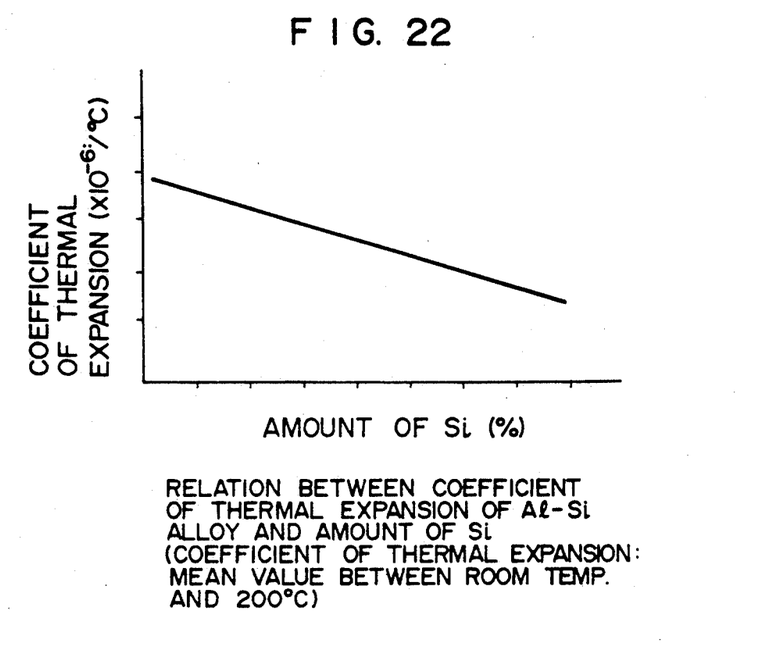
FIG. 22 is a graph showing the relation between the coefficient of thermal expansion of an Al-Si alloy and the amount of Si in the alloy.

The above description has been directed basically to the structure of the head arm 9 in which the deflection compensating member 15 is provided for the guide arm 8. However, deflection of the head arm 9 in the out-of-plane direction can also be prevented when the coefficient of thermal expansion of the guide arm 8 itself is suitably adjusted so as to become equal to that of the FPC 12. For example, when the guide arm 8 is formed of an aluminum-silicon alloy, the coefficient of thermal expansion of the guide arm 8 can be controlled by suitably changing the amount or percentage of silicon in the aluminum-silicon alloy. The relation between the coefficient of thermal expansion of such an alloy and the percentage of silicon in the alloy is shown in FIG. 22. (Reference is to be made to a paper entitled "Development and Application of Aluminum Powder Alloys" described in a text reported in the Fourth Meeting for Presentation of the Results of Studies on Development of Powder Metallurgy, the Japan Society of Powder Metallurgy Industry, Nov. 15, 1989.)

It is also apparent that deflection of the head arm 9 can be prevented by both the use of the deflection compensating member 15 and the adjustment of the coefficient of thermal expansion of the guide arm 8 itself.

Figure 23:
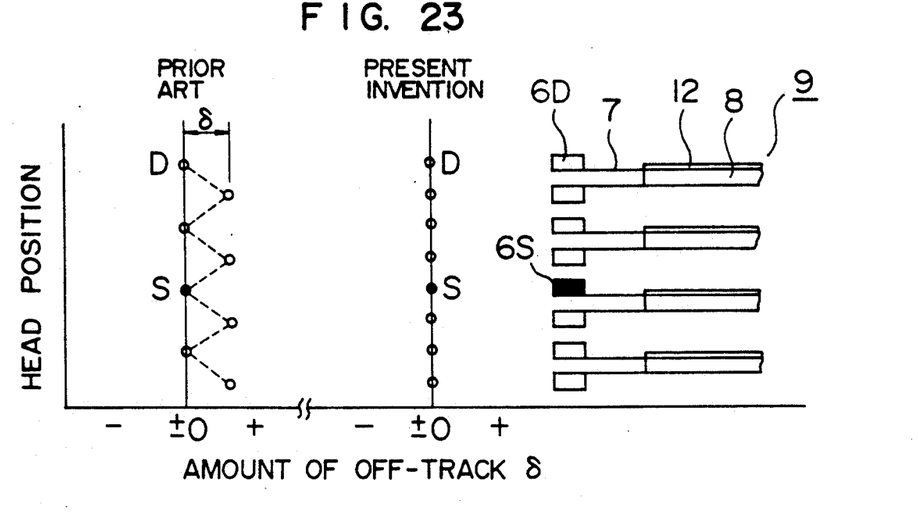
FIG. 23 illustrates the result of deflection compensation in the head arm of the present invention as compared to that in a prior art head arm.

The amount of off-track $\delta$ (thermal off-track) attributable to a temperature variation (a temperature rise) in the head arm 9 of the present invention when the head arm 9 is used in the magnetic disk drive shown in FIG. 3 was compared with that of a prior art head arm, and the results of this comparison are shown in FIG. 23. It will be seen in FIG. 23 that, in the case of the prior art head arm 9, a considerable amount of off-track $\delta$ occurs due to deflection attributable to a temperature variation. In FIG. 23, a servo head $6_S$ is mounted on the upper load arm 7 of one of the head arms 9, and, therefore, no off-track does not occur in the case of a data head $6_D$ mounted similarly on the upper load arm 7 of each of the head arms 9. Also, in FIG. 23, any off-track attributable to other causes is eliminated from the illustration for a better understanding of the present invention.

In sharp contrast, no deflection occurs on the head arm 9 of the present invention, and no off-track occurs also on all the magnetic heads 6, because undesirable deflection of the head arm 9 is prevented by the provision of the deflection compensating member 15.

It is apparent that the effect of deflection compensation is the same regardless of the number of the head arms 9 provided in the magnetic disk drive, and the present invention is also applicable to the case where only one head arm 9 is provided. Further, the structure of the magnetic disk drive is in no way limited to that shown in FIG. 3, and the magnetic disk drive may be of the type having a cantilever type spindle or of the type in which the carriage is adapted to move in a swing or rotary mode instead of the linear mode. However, in the case of the magnetic disk drive in which the carriage is adapted to move in the swing mode, the direction of seek differs from that of the magnetic disk drive using the linearly movable carriage. Therefore, in such a case, deflection compensating members 15 are preferably additionally provided on principal parts located in directions other than the direction of seek.

FIGS. 24, 25, 26, 27, 28 and 29 show other embodiments of the head arm 9 according to the present invention. In FIGS. 24 to 29, the same reference numerals used for describing the aforementioned embodiments are also used to designate the same parts so as to partly dispense with repetition of the same description. These embodiments are based on the inventors' novel discovery that a variation in the humidity of the environment leads also to deflection of the head arm 9.

Figure 24:
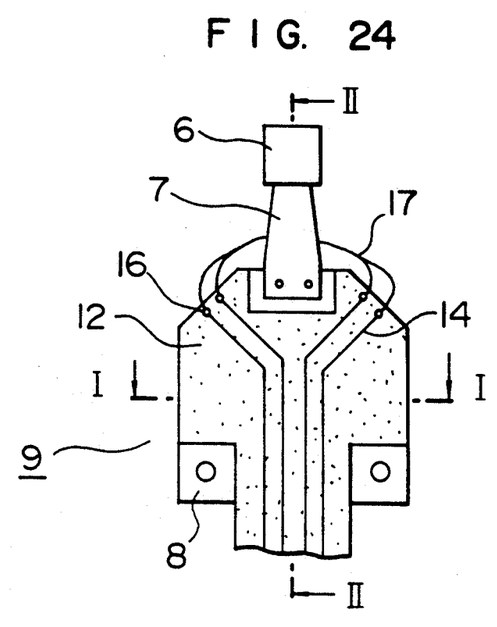
FIG. 24 is a schematic plane view of another embodiment of the head arm of the present invention.
Figure 25:
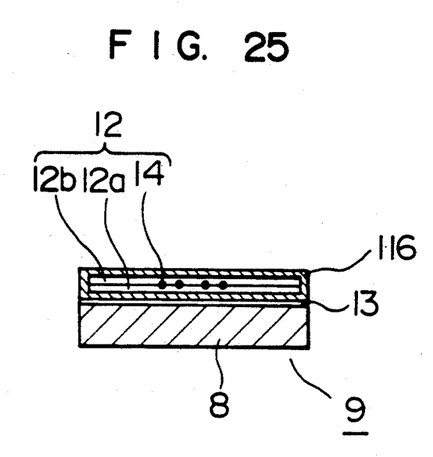
FIG. 25 is a schematic sectional view taken along the line I—I in FIG. 24.
Figure 26:
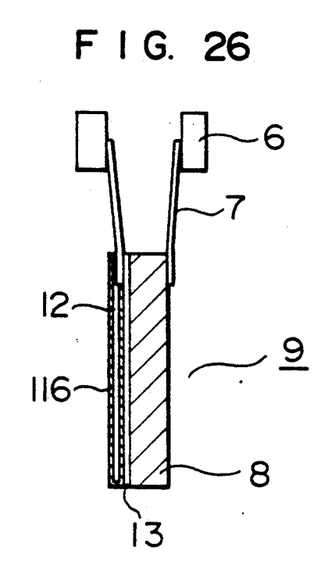
FIG. 26 is a schematic sectional view taken along the line II—II in FIG. 24.

FIG. 24 is a schematic plan view of an embodiment of the head arm 9, FIG. 25 is a schematic sectional view taken along the line I—I in FIG. 24, and FIG. 26 is a schematic sectional view taken along the line II—II in FIG. 24. Referring to FIGS. 24 to 26, the flexible printed circuit (FPC) 12 is bonded by the bonding agent 13 to one of the surfaces of the guide arm 8 formed of an aluminum alloy. The guide arm 8 and the FPC 12 have a small thickness. For example, the thickness of the guide arm 8 is several mm, and that of the FPC 12 is several ten $\mu$m to several hundred $\mu$m. The FPC 12 has such a laminated structure that the plural fine strip-like lead wires 14 each in the form of a copper foil for transmitting information to and from the magnetic heads 6 are sandwiched between the thin layers 12c and 12d of a polyimide resin.

The reference numeral 116 designates a covering layer covering the FPC 12. The material of this covering layer 116 is not especially limited except the requirements that it is not permeable to moisture and not affected by moisture in itself, that is, it does not expand nor contract by absorbing moisture. One or more of organic materials, inorganic materials and metal materials are suitably selected depending on the environmental condition in which the head arm 9 is used. The covering layer 116 is formed by a method such as coating, lining or plating while taking into account the factors including the material and thickness of the layer 116 and its adhesiveness to the FPC 12.

Figure 27:
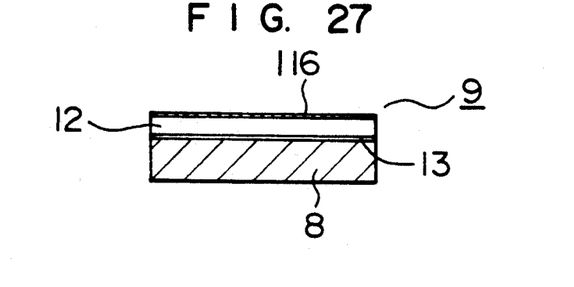
FIG. 27 is a schematic sectional view of another embodiment of the head arm of the present invention and corresponds to that taken along the line I—I in FIG. 24.

Formation of the covering layer 116 by a metal material having a high moisture proofness and a high resistance to permeation of moisture will now be described in detail. Preferred metal materials suitable for practical use include aluminum, nickel, chromium, titanium, iron, copper, tin, lead, zinc and their alloys or stainless steel. Also, gold, silver and non-metallic materials such as ceramics and teflon may be used. The following points are to be especially noted when the covering layer 116 is formed by coating, lining or plating. In the first place, the FPC 12 is to be entirely completely covered by the covering layer 116 without exposing whatever part of the FPC 12. Secondly, the lead wires 14 and the connection terminals 16 for the exposed lead wires 17 are to be covered after being completely electrically insulated. Thirdly, the thickness of the covering layer 116 is preferably as small as possible from the viewpoint of the light weight of the head arm 9. However, when it is difficult to completely cover the entire FPC 12, the FPC 12 may be partly covered. In this case too, the covering layer 116 should cover a widest possible area of the FPC 12. FIG. 27 shows such a modification of the head arm 9 and corresponds to a schematic sectional view taken along the line I—I in FIG. 24. In the modification shown in FIG. 27, the covering layer 116 does not cover the surface of the FPC 12 where the FPC 12 is bonded to the guide arm 8 and merely covers the surface (the upper surface in FIG. 27) which is directly exposed to air. In such a case, the covering layer 116 may be bonded to the upper surface of the FPC 12 without resorting to the coating, lining or plating.

The above description refers to the provision of the covering layer 116 so as to prevent deflection (deformation) of the head arm 9 due to a variation in the humidity of the environment. Further, by the provision of the covering layer 116, deflection (thermal deformation) of the head arm 9 due to a variation in the temperature of the environment can also be prevented. That is, when the coefficient of thermal expansion of the guide arm 8 in the head arm 9 is larger than that of the FPC 12 (including the polyimide layers 12c, 12d and the lead wires 14), the covering layer 116 is formed of a metal having a large coefficient of thermal expansion, so that the coefficient of thermal expansion of the FPC 12 covered with the covering layer 116 becomes substantially equivalent to that of the guide arm 8. On the other hand, when the coefficient of thermal expansion of the guide arm 8 is smaller than that of the FPC 12, the covering layer 116 is formed of a metal having a small coefficient of thermal expansion, so that the coefficient of thermal expansion of the FPC 12 covered with the covering layer 116 becomes substantially equivalent to that of the guide arm 8.

The method for providing the equivalent coefficient of thermal expansion described above includes selection of a material suitable for forming the covering layer 116 and optimization of the thickness of the covering layer 116. Because the selection of the material suitable for forming the covering layer 116 has a certain limitation, it is preferable to adjust the thickness of the covering layer 116 as a matter of practice. The coefficient of thermal expansion of the guide arm 8 is 23 to $24 \times 10^{-6}/°$ C. when it is formed of an aluminum alloy. Therefore, a material having a coefficient of thermal expansion smaller than that of the aluminum alloy is preferably selected for providing the covering layer 116 by coating, lining or plating. An example of such a material is nickel whose coefficient of thermal expansion is $13.3 \times 10^{-6}/°$ C., chromium whose coefficient of thermal is $6.2 \times 10^{-6}/°$ C., a stainless steel whose coefficient of thermal expansion is 10 to $18 \times 10^{-6}/°$ C. or titanium whose coefficient of thermal expansion is $8.4 \times 10^{31}$ $6/°$ C. On the other hand, a material having a coefficient of thermal expansion larger than that of the guide arm 8 and preferably used for providing the covering layer 116 by coating, lining or plating is, for example, lead whose coefficient of thermal expansion is $29.3 \times 10^{-6}/°$ C. or zinc whose coefficient of thermal expansion is $39.7 \times 10^{-6}/°$ C.

When the expansion and contraction of the bonding agent 13 due to a variation in the temperature of the environment provides a source which will greatly affect the effect of deflection compensation of the head arm 9, the thermal expansion of the bonding agent 13 should be taken into account together with the thermal expansion of both the guide arm 8 and the FPC 12 so as not to cause thermal deformation of the head arm 9. Also, when both a temperature variation and a humidity variation are to be taken into account so as to attain the desired deflection compensation, the combination of the aforementioned covering method dealing with the temperature variation and the aforementioned covering method dealing with the humidity variation is preferably employed.

While the above description refers to the case where the guide arm 8 is formed of an aluminum alloy, and the layers 12a, 12b of the FPC 12 are formed of a polyimide resin, it is apparent that the materials of the guide arm 8 and the FPC 12 are in no way limited to such specific ones. For example, the material of the guide arm 8 may be another metal such as a magnesium alloy, and the material of the layers 12c, 12d of the FPC 12 may be another resin such as a polyamide resin or an epoxy resin. Further, the material enclosing the lead wires 14 in the FPC 12 may be replaced by, for example, a ceramic material which is an electrical insulator although the flexibility is somewhat lowered.

Figure 28:
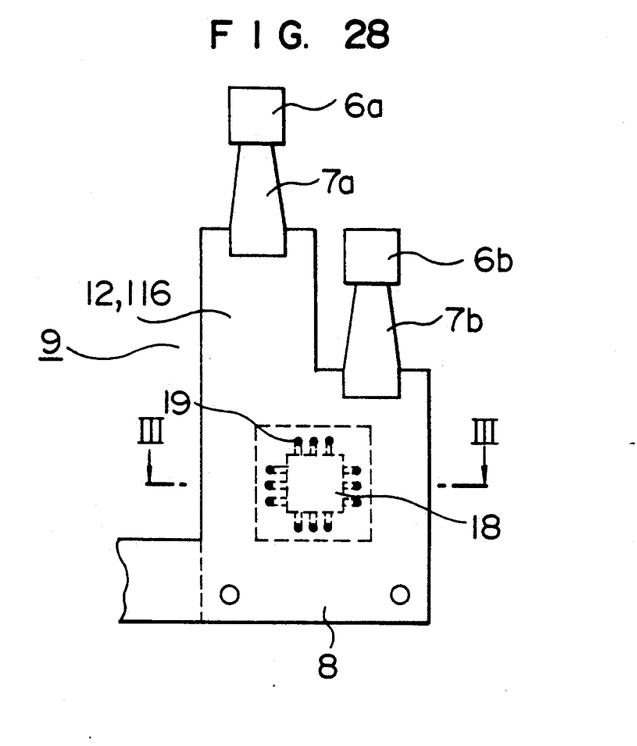
FIG. 28 is a schematic plane view of another embodiment of the head arm of the present invention.
Figure 29:
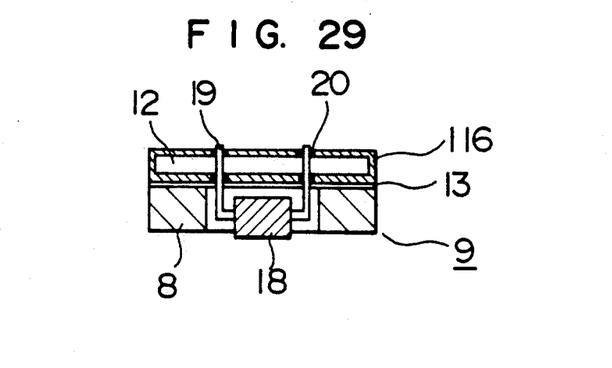
FIG. 29 is a schematic sectional view taken along the line III—III in FIG. 28.

FIG. 28 is a schematic plan view of another modification of the head arm 9 having an IC chip 18, and FIG. 29 is a schematic sectional view taken along the line III—III in FIG. 28. It will be seen that the FPC 12 is entirely similarly covered with the covering layer 116, and pin terminals 19 of the IC chip 18 extending to the exterior through holes 20 bored in the covering layer 116 are electrically insulated. When the IC chip 18 in this modification can also be covered by coating, lining or plating, the IC chip 18 may be covered at the time of covering the FPC 12 with the covering layer 116 so as to enhance the efficiency of the covering step.

In the embodiments shown in FIGS. 24 to 29, the object, to which the covered FPC 12 is attached or bonded, is limited to the head arm 9 incorporated in a magnetic disk drive. However, the object is in no way limited to such a specific article or product. The covering method described above can also be applied to any one of articles which are provided with the FPC and whose thermal deformation due to a temperature variation, a humidity variation, etc. is to be prevented. For example, the article may be a circuit board on which an IC chip or the like is mounted.

In the embodiments shown in FIGS. 24 to 29, no deflection of the head arm 9 occurs because the FPC 12 is completely or partly covered by, for example, coating so as to prevent deflection of the head arm 9 due to a temperature variation and/or a humidity variation. Thus, off-track attributable to undesirable deflection of the head arm 9 can be eliminated, and a magnetic disk drive having head positioning accuracy better than that of a prior art one can be provided according to the present invention.

We claim:

1. A head arm for a magnetic disk drive comprising:
   a guide arm disposed between a magnetic head and an actuator so as to transmit an actuating force of said actuator to said magnetic head thereby guiding said magnetic head along a plane of a magnetic disk;
   a printed circuit fixed to said guide arm, a major portion of said printed circuit being formed of a moisture absorptive material; and
   a covering layer provided over at least a portion of surfaces of the printed circuit, said covering layer being formed of a material which is non-permeable to moisture, non-expandable and non-contractible due to absorption of moisture.

2. A head arm for use in a magnetic disk drive according to claim 1, wherein said moisture absorptive material is a polymer, and said covering material is a metal.

3. A head arm for use in a magnetic disk drive according to claim 1, wherein said guide arm is provided with an IC chip, and pin terminals of said IC chip are electrically insulated from said covering layer.

* * * * *